United States Patent
Zhang et al.

(10) Patent No.: US 10,650,495 B2
(45) Date of Patent: May 12, 2020

(54) HIGH RESOLUTION STYLE TRANSFER

(71) Applicant: Adobe Inc., San Jose, CA (US)

(72) Inventors: Zhifei Zhang, Knoxville, TN (US); Zhe Lin, Fremont, CA (US); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 117 days.

(21) Appl. No.: 15/997,386

(22) Filed: Jun. 4, 2018

(65) Prior Publication Data

US 2019/0370936 A1    Dec. 5, 2019

(51) Int. Cl.
*G06K 9/62* (2006.01)
*G06T 3/40* (2006.01)
*G06K 9/68* (2006.01)
*G06K 9/46* (2006.01)

(52) U.S. Cl.
CPC .......... *G06T 3/4046* (2013.01); *G06K 9/4671* (2013.01); *G06K 9/6857* (2013.01); *G06T 2207/10024* (2013.01); *G06T 2207/20084* (2013.01)

(58) Field of Classification Search
CPC ........ B41J 11/008; B41J 13/02; B41J 13/103; B41J 13/12; B41J 23/02
USPC .......................................................... 382/157
See application file for complete search history.

(56) References Cited

U.S. PATENT DOCUMENTS 9,842,416 B2 * 12/2017 Neulander ......... G06K 9/00221
2019/0259134 A1 * 8/2019 Rainy ...................... G06N 3/08

OTHER PUBLICATIONS

Chen, "Fast Patch-based Style Transfer of Arbitrary Style", Dec. 13, 2016, 10 pages.
Ledig, "Photo-Realistic Single Image Super-Resolution Using a Generative Adversarial Network", May 25, 2017, 19 pages.

* cited by examiner

*Primary Examiner* — Charlotte M Baker
(74) *Attorney, Agent, or Firm* — SBMC (57) ABSTRACT

High resolution style transfer techniques and systems are described that overcome the challenges of transferring high resolution style features from one image to another image, and of the limited availability of training data to perform high resolution style transfer. In an example, a neural network is trained using high resolution style features which are extracted from a style image and are used in conjunction with an input image to apply the style features to the input image to generate a version of the input image transformed using the high resolution style features.

20 Claims, 7 Drawing Sheets
(4 of 7 Drawing Sheet(s) Filed in Color)

HIGH RESOLUTION STYLE TRANSFER

BACKGROUND

Style transfer enables style information from one image (a "style image") to be transferred to another image, a content image, to transform the content image based on style attributes of the style image. For instance, brush stroke and color information from an image of a painting can be transferred to a photograph to generate a stylized version of the photograph that includes the original content of the photograph transformed using the brush stroke and color information from the painting.

Machine learning and neural networks can be leveraged to provide particularly powerful tools for performing style transfer. A computing device, for instance, may train a neural network using machine learning based on a training style image and style features that identify style attributes exhibited by the training style image. The computing device may then process an input image using the trained neural network to transform the input image into a stylized version of the input image that matches various style attributes of the training style image.

In some conventional techniques, convolutional neural networks (CNN) are utilized to migrate style information from style images to input content images. Such techniques typically rely on iteratively processing an input image using a trained CNN to enable the input image to gradually approach the style of a particular style image. These techniques, however, can be time and resource intensive due to their high computational complexity.

Other conventional techniques utilize feedforward networks to perform one-pass style transfer from a style image to an input image. While these techniques may reduce the computational complexity of CNN-based techniques for a single style transfer project, they are typically limited in that separate models must be trained for each style image. This limits the applicability of the techniques for applying different styles. Some more recent techniques have endeavored to adapt feedforward networks to achieve fast style transfer using arbitrary styles, but these techniques typically only achieve coarse style information transfer and fail to capture finer texture features from a style image.

SUMMARY

High resolution style transfer techniques and systems are described that overcome the challenges of transferring high resolution style features from one image to another image, and of the limited availability of training data to perform high resolution style transfer. In an example, high resolution style features are extracted from a style image and are used in conjunction with a input image to apply the style features to the input image to generate a version of the input image transformed using the high resolution style features.

To do so, a style transfer neural network is first leveraged to transfer coarse style features from a style image to an input image to generate a transferred image, which represents a version of the input image transformed with style features from the style image. Feature maps are then generated using upscaled versions of the style image and the transferred image. Using the feature maps, a resolution neural network is leveraged to perform a feature swap process that generates a swapped feature map that includes high resolution style features from the upscaled style image that are exchanged ("swapped") for matching features from the upscaled transferred image. The swapped feature map and the upscaled transferred image are then input into the resolution neural network, which applies the high resolution style features from the swapped feature map to the upscaled transferred image to generate a resolved image as output. Generally, the resolved image represents a version of the original style transferred image with higher resolution style features than the original transferred image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Style transfer has achieved great progress with the advancement of neural networks. However, this advancement has been hindered by conventional implementations of neural networks. Conventional style transfer techniques, for instance, are typically unable to capture and transfer high-resolution style features from a style image, such as high-resolution color and texture details. Further, conventional style transfer techniques that leverage neural networks are computationally expensive (e.g., in terms of processor and memory resources), and/or are unable to adapt to changing style image inputs. Additionally, since previous style transfer techniques are unable to transfer high-resolution style features, there is accordingly a lack of training data for training a neural network to perform high-resolution style transfer.

Accordingly, high resolution style transfer techniques are described that overcome the challenges of limited resolution of transferred style details and limited availability of training data to perform high-resolution style transfer. In an implementation, a style image is selected that includes various style features, such as color features, texture features (e.g., brush stroke and/or other surface features), tone features (e.g., relative brightness or contrast), shape features, and so forth. The style image, for instance, can be an image of a painting or other artwork that has a distinctive collection of style features. Further, an input image is selected that includes a particular set of content, such as an image and/or a scene. In an example, the input image can be a photograph of a real-life image, such as a person or a geographical location. Techniques described herein are effective to extract style features from the style image at different resolutions and apply them to the input image to transform the content of the input image into a stylized version of the input image that includes high-resolution style features from the style image.

To do so, a first set of style features from the style image are extracted and used to train a style transfer neural network. The first set of style features, for instance, represent coarse color and texture features extracted from the style image. The input image is then processed using the style transfer network to generate a transferred image as output, which represents a version of the input image that is transformed to reflect coarse style features from the style image.

A resolution neural network is then employed to apply high resolution style features from the style image to the transferred image to generate a resolved image, which represents a version of the transferred image with higher resolution style features than the original transferred image. To obtain training data for the resolution neural network, high resolution style features are extracted from an upscaled version of the style image to generate a style image feature map. The upscaled style image, for instance, represents a larger, higher-resolution version of the original style image. As further detailed below, high resolution style features can be extracted in various ways, such as by patch sampling from the upscaled style image.

The training data for the resolution neural network further includes content features extracted from an upscaled version of the transferred image to generate a transferred image feature map. For example, patches are sampled from an upscaled version of the transferred image and populated to the transferred image feature map.

The style image feature map and the transferred image feature map are then used to train the resolution neural network. As part of the training process, the resolution neural network performs a style swap process between the two feature maps to generate a swapped feature map. For instance, style features from the style image feature map are matched to content features from the input image feature map. For each content feature from the transferred image feature map, for example, a style feature is identified that most closely matches the content feature. Style features are then "swapped" with matching content features to generate the swapped feature map. Accordingly, the swapped feature map is populated with high-resolution style details from the style image feature map.

Once the swapped feature map is generated, the swapped feature map and the upscaled transferred image are input into the resolution neural network. The resolution neural network applies high-resolution style features from the swapped feature map to the upscaled transferred image to generate a resolved image as output. As mentioned above, the resolved image represents a version of the original style transferred image with higher resolution style features than the original transferred image.

The process described above and detailed below may be iteratively performed to obtain progressively higher resolution style transfer. For instance, after an initial resolved image is generated by the resolution style network, the resolved image can be used as further input into the process, as described herein with reference to the transferred image. Thus, even higher resolution style features can be extracted and applied to the initial resolved image to generate further resolved images that exhibit higher resolution style features than the initial resolved image.

Accordingly, techniques for high resolution style transfer described herein overcome limitations of previous techniques by enabling high resolution style features to be extracted and used as training data for neural networks, and to enable trained neural networks to apply the high resolution style features to input images to generate input images transformed to reflect the high resolution style features.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
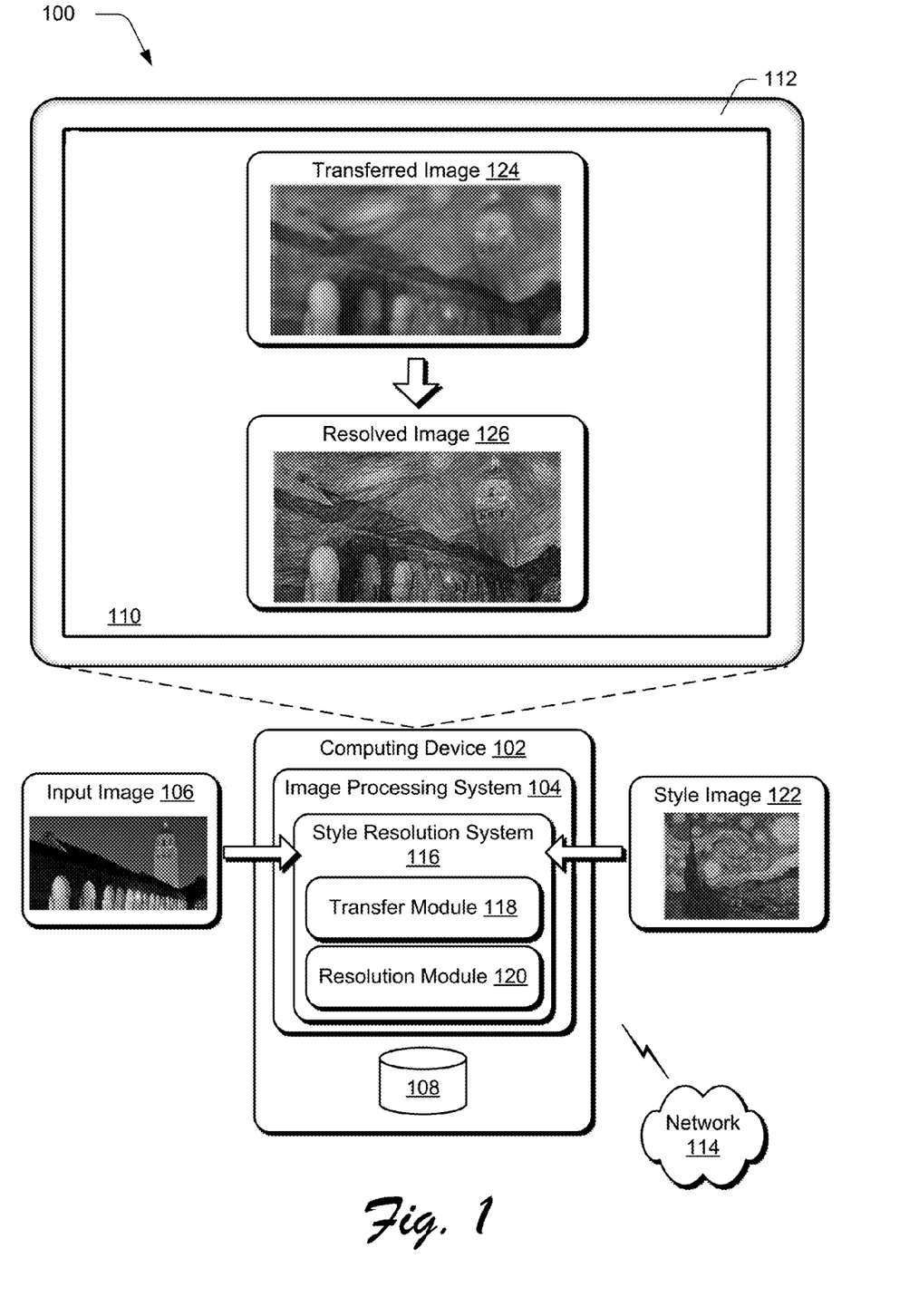
FIG. 1 is an illustration of an environment in an example implementation that is operable to employ high resolution style transfer techniques described herein.

FIG. 1 is an illustration of a digital medium environment 100 in an example implementation that is operable to employ high resolution style transfer techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including an image processing system 104. The image processing system 104 is implemented at least partially in hardware of the computing device 102 to process and transform an input image 106, which can be stored in a storage 108 of the computing device 102, and/or at a remote network-based storage location. Such processing includes creation of the input image 106, modification of the input image 106, and rendering of the input image 106 in a user interface 110 for output, e.g., by a display device 112. Although illustrated as implemented locally at the computing device 102, functionality of the image processing system 104 may also be implemented as whole or part via functionality available via a network 114, such as part of a web service and/or in a cloud-based implementation.

An example of functionality incorporated by the image processing system 104 to process the input image 106 is illustrated as a style resolution system 116. The style resolution system 116 includes a transfer module 118 and a resolution module 120, which can individually and/or cooperatively be leveraged to perform techniques for high resolution style transfer described herein. The style resolution system 116, for instance, takes as input the input image 106 and a style image 122. The style transfer module 118 determines style attributes of the style image 122, and transfers the style attributes to the input image 106 to generate a transferred image 124. Generally, the transferred image 124 represents a transformed version of the input image 106 that is transformed to approximate various style attributes of the style image 122.

The transferred image 124, however, typically includes coarse approximations of style attributes of the style image 122, such as course textures and color separations approximated from the style image 122. Accordingly, the resolution module 120 processes the transferred image 124 to apply fine resolution style attributes from the style image 122 to the transferred image 124 to generate a resolved image 126. As further detailed below, the resolved image 126 more closely reflects fine grained (e.g., high resolution) style attributes of the style image 122 than does the transferred image 124, such as fine texture attributes (e.g., brush stroke attributes and texture variations), color attributes (e.g., color matching and color separation), color contrast features, and so forth.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

High Resolution Style Transfer Digital Environment

The following discussion describes example implementation scenarios and procedures for high resolution style transfer. Aspects of each of the scenarios and procedures may be implemented in hardware, firmware, software, or a combination thereof. The procedures are shown as a set of blocks that specify operations performed by one or more devices and are not necessarily limited to the orders shown for performing the operations by the respective blocks.

Figure 2:
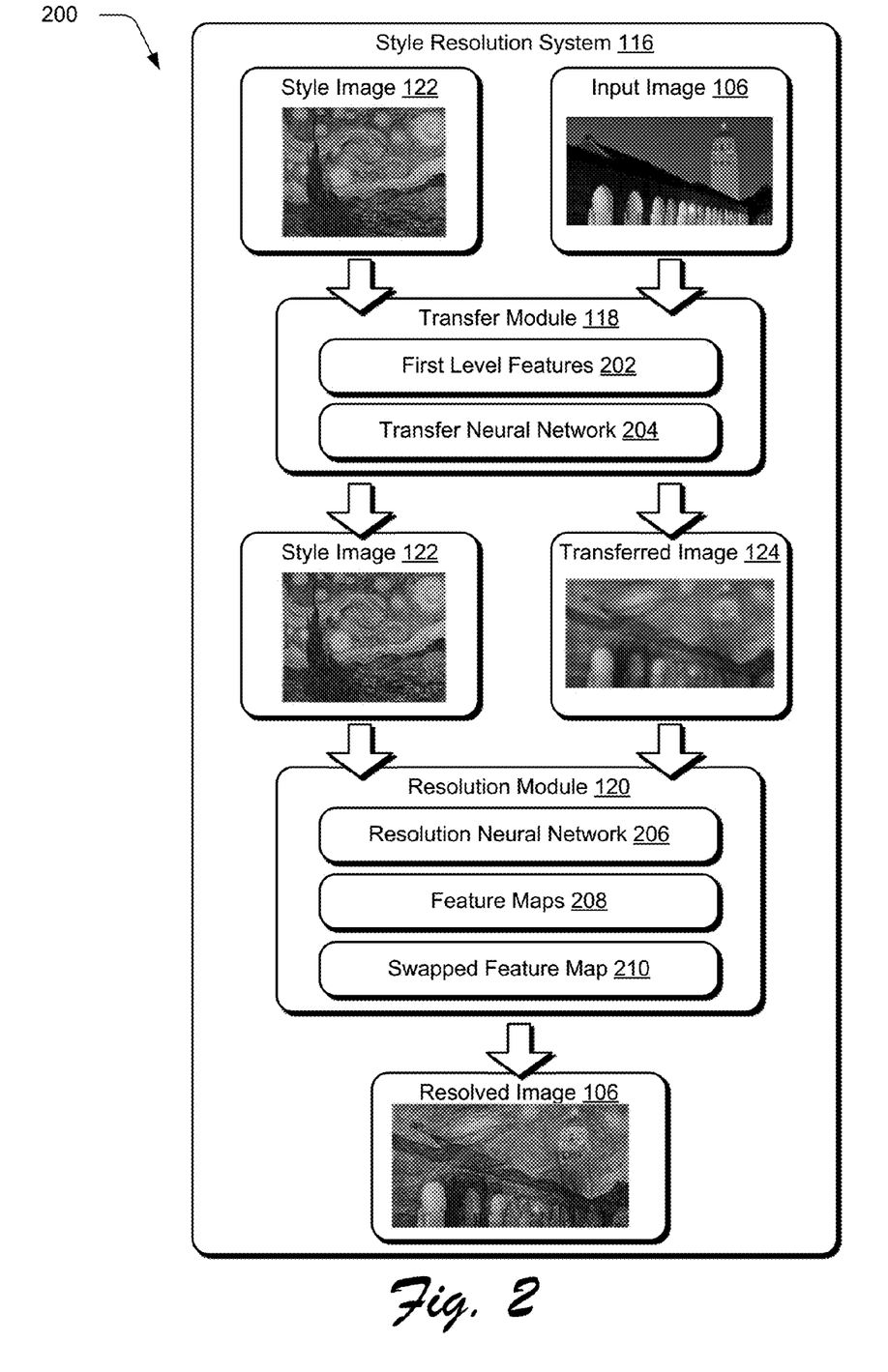
FIG. 2 depicts an example implementation scenario including an overview of an example architecture and process for performing techniques for high resolution style transfer.

FIG. 2 depicts an implementation scenario 200 including an overview of an example architecture and process for performing techniques for high resolution style transfer. In the scenario 200, the transfer module 118 receives the style image 122 as input and processes the style image 122 to identify first level features 202 from the style image 122. Generally, the first level features 202 represent high-level features of the style image 122 that are captured at a particular resolution, such as coarse texture attributes, color attributes, luminance, contrast, and so forth. The first level features 202 are then used as a training data set to train a transfer neural network 204.

After the transfer neural network 204 is trained, the input image 106 is input into the transfer neural network 204 (e.g., in a forward propagation mode), and the output is represented as the transferred image 124. As mentioned above, the transferred image 124 includes some style attributes of the style image 122, but may lack some higher resolution attributes, such as fine textures and color separations.

Accordingly, to enable application of such high level attributes, the transferred image 124 and the style image 122 are leveraged by the resolution module 120 to train a resolution neural network 206. For instance, and as further detailed below, the style image 122 and the transferred image 124 are upscaled and sampled to generate feature maps 208 for each of the style image 122 and the transferred image 124. A style swap process is then performed on the feature maps 208 to generate a swapped feature map 210, which represents high resolution style details from the upscaled version of the style image 122. The resolution neural network 206 takes as input the swapped feature map 210 and the upscaled version of the transferred image 124 to generate the resolved image 126. The resolution neural network 206, for instance, applies high resolution style attributes from the swapped feature map 210 to the transferred image 124 to generate the resolved image 126.

Figure 3:
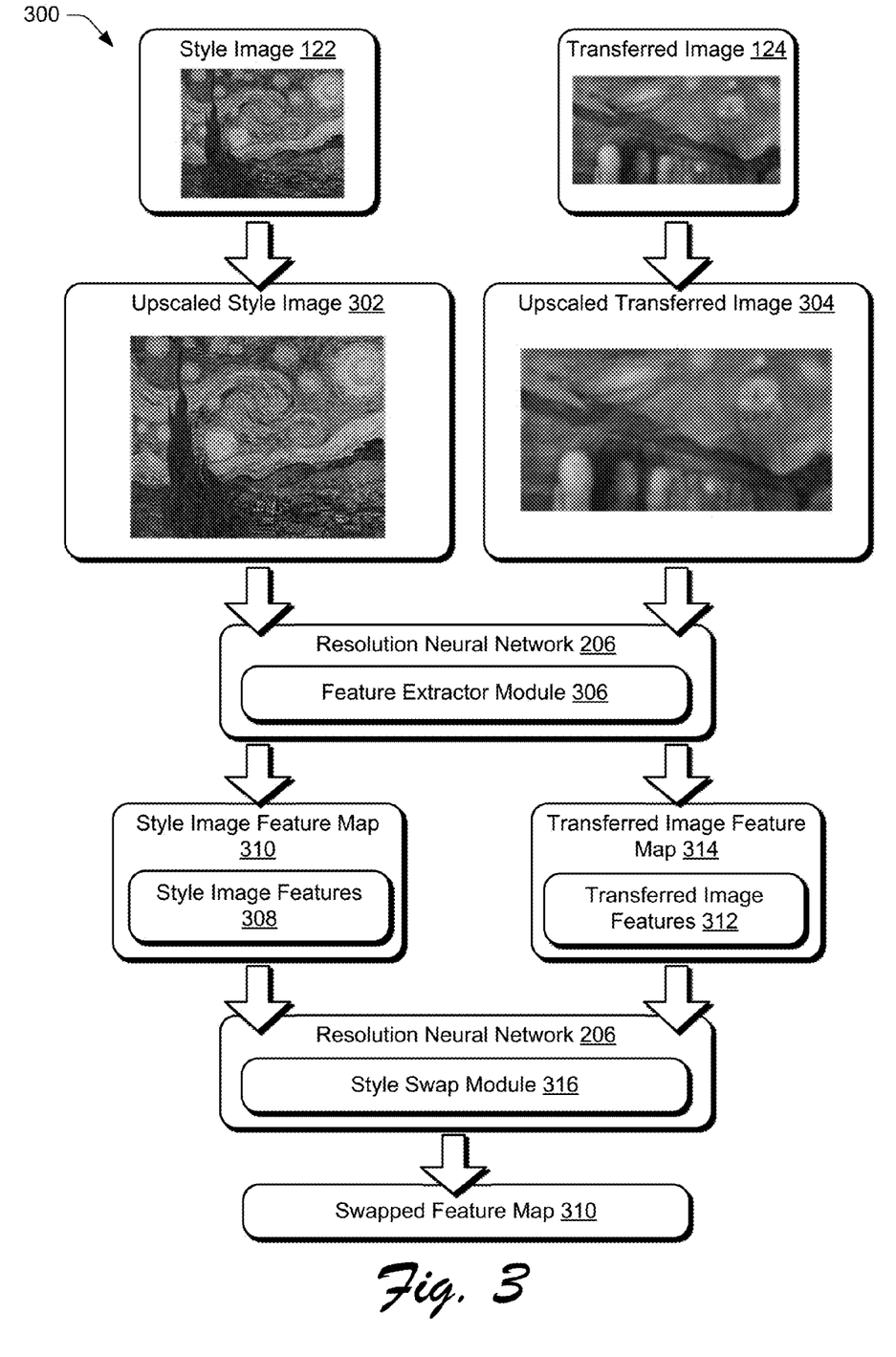
FIG. 3 depicts an example implementation scenario for generating feature maps and a swapped feature map.
Figure 4:
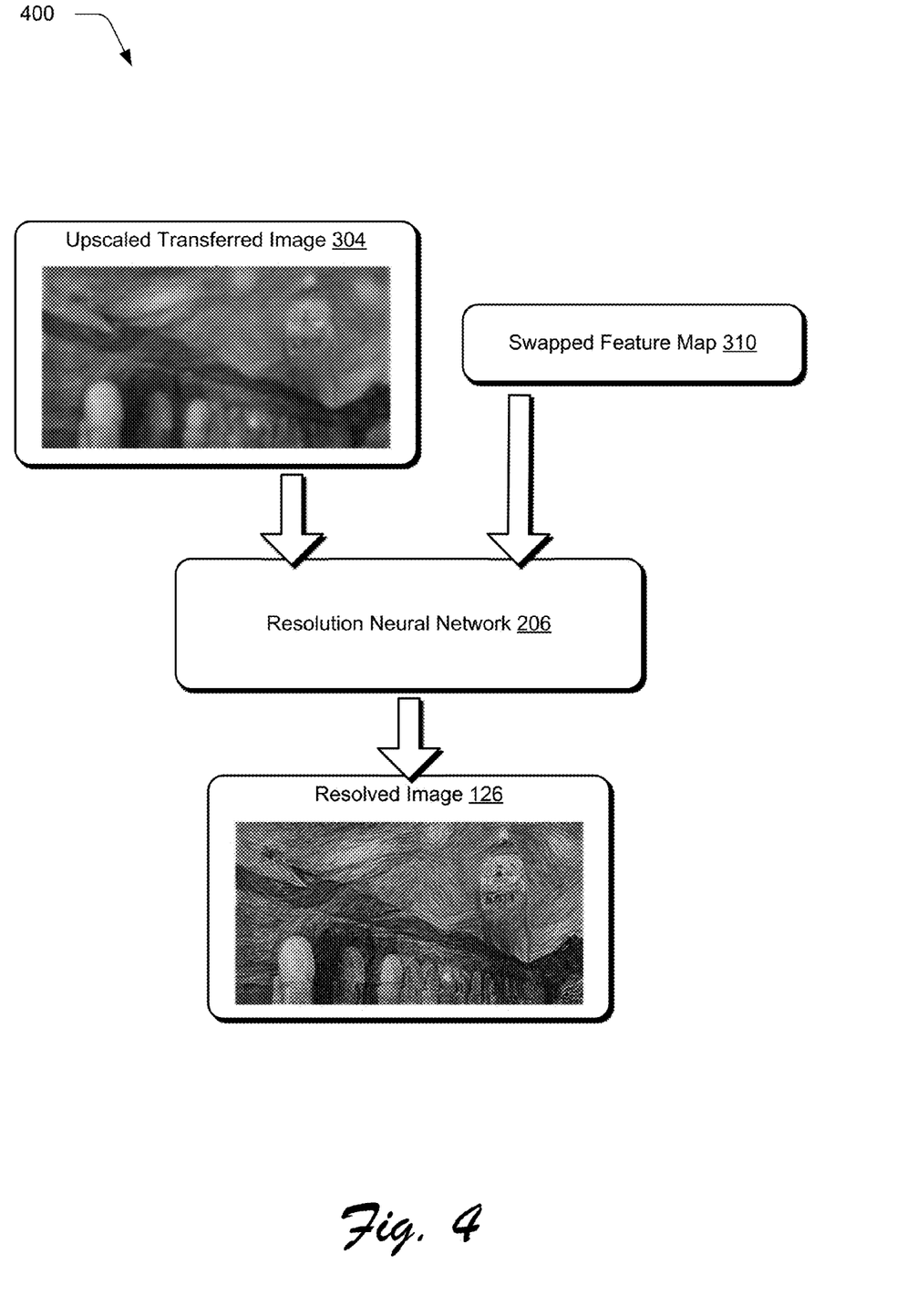
FIG. 4 depicts an example implementation scenario for generating a resolved image using a swapped feature map.

FIGS. 3 and 4 depict example scenarios that provide detailed operations of aspects of the scenarios introduced above. Generally, different aspects of the scenarios can be performed by the style resolution system 116. FIG. 3 depicts an example scenario 300 for generating the feature maps 208 and the swapped feature map 210 referenced above. The scenario 300 starts with the style image 122 and the transferred image 124 both being upscaled (e.g., increased in size and/or resolution) to generate an upscaled style image 302 and an upscaled transferred image 304, respectively. In at least some implementations, the upscaled style image 302 and the upscaled transferred image 304 are the same size and/or resolution, or are approximately the same size and/or resolution, e.g., within +/−5%.

One example technique for upscaling involves processing the style image 122 and the transferred image 124 using a super resolution generative adversarial network (SRGAN) to generate the upscaled style image 302 and the upscaled transferred image 304, respectively. An SRGAN, for example, represents a deep residual neural network that can be trained by sampling the style image 122 and the transferred image 124 to enable the SRGAN to estimate high resolution features from the style image 122 and the transferred image 124. The SRGAN then uses the estimated high resolution features to generate the upscaled style image 302 and the upscaled transferred image 304, respectively. Alternatively or additionally, different versions of the style image 122 can be maintained at different relative scales and/or resolutions.

Continuing with the scenario 300, a feature extractor module 306 operating as part of the resolution neural network 206 processes the upscaled style image 302 to extract style image features 308 and to generate a style image feature map 310 that includes the style image features 308. The style image features 308, for example, represent various style features extracted from the upscaled style image 302. Generally, the style image feature map 310 can be generated in various ways. For instance, in an implementation, the feature extractor module 306 crops random patches from the upscaled style image 302 to obtain the style image features 308. The patches can be any suitable size, such as 320 pixels×320 pixels. The feature extractor module 306 then uses the cropped patches as inputs to a pre-trained Visual Geometry Group ("VGG") model (e.g., as layer relu3_1) configuration of the resolution neural network 206 to extract high-level features of the upscaled style image 302 that represent the style image features 308. The style image features 308 are then populated to the style image feature map 310.

Further, the feature extractor module 306 operating as part of the resolution neural network 206 processes the upscaled transferred image 304 to extract transferred image features 312 and to generate a transferred image feature map 314 that includes the transferred image features 312. The feature extractor module 306, for example, crops random patches from the upscaled transferred image 304 to obtain the transferred image features 312. The patches can be any suitable size, such as 320 pixels×320 pixels. The feature extractor module 306 then uses the cropped patches as inputs to a pre-trained VGG model (e.g., as layer relu3_1) configuration of the resolution neural network 206 to extract the transferred image features 312 from the upscaled transferred image 304. The transferred image features 312 are then populated to the transferred image feature map 314.

Proceeding with the scenario 300, the style image feature map 310 and the transferred image feature map 314 are used as inputs to a style swap module 316 that performs a style swap process to generate a swapped feature map 210. The style swap module 316, for instance, operates as part of the resolution neural network 206 to perform patch matching between the style image feature map 310 and the transferred image feature map 314.

One example way of performing patch matching involves sampling patches (e.g., 3 pixel×3 pixel patches) from each of the style image feature map 310 and the transferred image feature map 314, and then comparing the patches to identify the most similar patches. For instance, a particular style patch from the style image features map 310 is selected and compared to the patches from the transferred image feature map 314 to identify a particular patch (a "style image patch") from the style image feature map 310 that most closely matches the features of a transferred image patch. The identified style image patch is then used to replace the transferred image patch (is "swapped" with the transferred image patch) and populated to the swapped feature map 210. This process is performed for each patch of the transferred image feature map 314 to generate the swapped feature map 210.

In an example implementation, to determine the similarity between respective patches from the style image feature map 310 and the transferred image feature map 314, an inner product (e.g., the dot product) between each two patches of the style image feature map 310 and the transferred image feature map 314, respectively, is calculated. The patches, for instance, are generated as vector representations, and the inner product between vector representations of the style image patches and the transferred image patches is calculated. Generally, a higher inner product indicates a higher feature similarity between two patches. Accordingly, a style image patch with a highest inner product for a transferred image patch is selected as a match to the transferred image patch, and is thus swapped for the transferred image patch. This process is performed for each transferred image patch to generate the swapped feature map 210. Since the style image feature map 310 carries high resolution style feature details from the upscaled style image 302, the swapped feature map 210 will have higher resolution feature details than the transferred image feature map 314.

FIG. 4 depicts an example scenario 400 for generating the resolved image 126. Generally, the resolution neural network 206 takes the upscaled transferred image 304 and the swapped feature map 210 as inputs, and outputs the resolved image 126. The resolution neural network 206, for instance, replaces features from the upscaled transferred image 304 with the high resolution details from the swapped feature map 210 to generate the resolved image 126.

To enable the resolution neural network 206 to generate the resolved image 126, the resolution neural network 206 is trained using the different images described above as training data. For instance, the following loss functions can be applied to the resolution neural network 206 during the training process.

$$L_{reconst} = \|I_{ss} - I\|_2 \quad (1)$$

Equation (1) uses a reconstruction loss function to calculate the loss between the resolved image 126 and the "ground truth" transferred image 124. I refers to the transferred image 124, and $I_{ss}$ is the resolved image 126. Generally, the goal of the reconstruction loss is to reduce loss of content from the original.

$$L_{percep} = \|\phi_l(I_{ss}) - \phi_l(I)\|_2 \quad (2)$$

Equation (2) uses a perception loss function to calculate the loss (e.g., "distance") between a feature map for the resolved image 126 ($\phi_l(I_{ss})$) and a feature map for the original transferred image 124, $\phi_l(I)$. In at least one implementation, this loss is calculated on a layer l of the VGG model, e.g., at the relu3_1 layer. For instance, the resolved image 126 and the transferred image 124 are input into the VGG model to obtain feature maps for each, and then equation 2 is applied to compute the distance between the two feature maps.

$$L_{adv} = -D(I_{ss}) \quad (3)$$

Equation (3) uses an adversarial loss function with a discriminator D to fine tune the high resolution textures in the resolved image 126, i.e., $I_{ss}$, D, for instance, represents a discriminator portion of a generative adversarial network (GAN) that can evaluate features of the resolved image 126 and identify and eliminate features that have synthetic visual attributes and thus may reduce the realistic appearance of the resolved image 126.

$$L_{style} = \|G(\phi_l(I_{ss})) - G(M_{swap})\|_2 \quad (4)$$

Equation (4) uses a style loss function to optimize the high resolution features from the upscaled style image 302 that are captured in the swapped feature map 210 ($M_{swap}$) are reflected in the resolved image 126, $I_{ss}$. To do this, a Gram matrix G is calculated for each of the $I_{ss}$ and $M_{swap}$ and according to the VGG model.

These loss functions can be applied in various ways to train the resolution neural network 206. For instance, in one implementation the resolution neural network 206 is trained in two stages. The first stage trains the resolution neural network 206 for 50 epochs using the reconstruction loss function, equation (1). In one example, the learning rate for the first stage is set at $1e^{-4}$. The second stage trains the resolution neural network 206 for 200 epochs using all four of the loss functions described above. In one example, the learning rate for the second stage is set at $1e^{-5}$.

Figure 5:
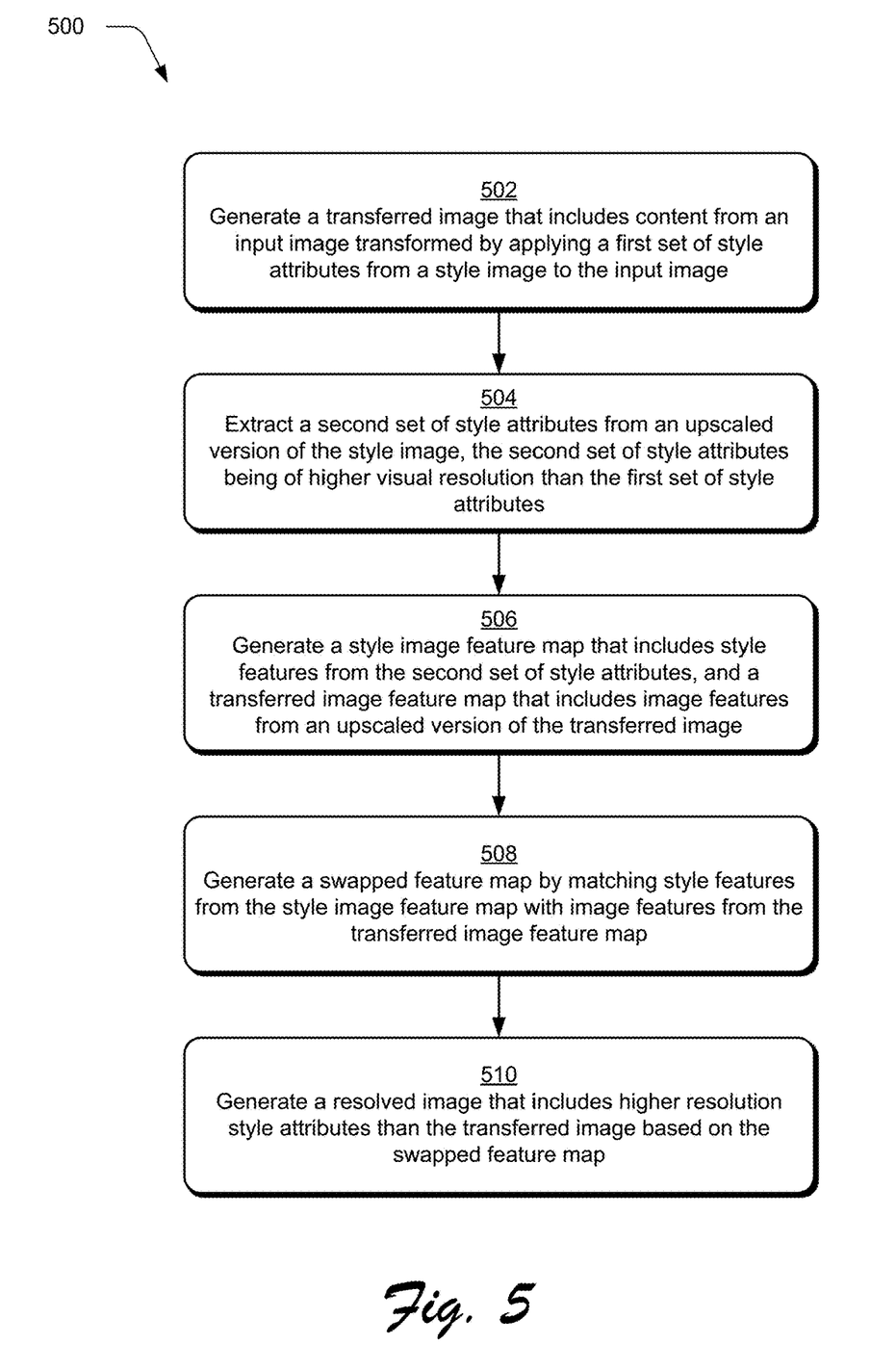
FIG. 5 depicts a procedure in an example implementation of high resolution style transfer using a style resolution system.

FIG. 5 depicts a procedure 500 in an example implementation of high resolution style transfer using a style resolution system. Step 502 generates a transferred image that includes content from an input image transformed by applying a first set of style attributes from a style image to the input image. The transfer module 118, for instance, operating as part of the style resolution system 116 takes the style image 122 and the input image 106 as inputs to the transfer neural network 204. Using the style image 122 and the input image 106 as training data, the transfer neural network 204 outputs the transferred image 124.

Step 504 extracts a second set of style attributes from an upscaled version of the style image, the second set of style attributes being of higher visual resolution than the first set of style attributes. For example, the feature extractor module 306, operating as part of the style resolution system 116, takes the upscaled style image 302 as input to the resolution neural network 206 to extract the style image features 308 from the upscaled style image 302. As described above, the feature extractor module 306 can extract style features from the upscaled style image by sampling patches from the upscaled style image 302, such as by randomly sampling patches of a discrete size.

In an implementation, the style resolution system 116 maintains multiple versions of the style image 122 that are each of different resolutions, e.g., successively higher resolutions. Alternatively or additionally, the style resolution system 116 can leverage the resolution neural network 206 to generate versions of the style image 122 at different resolutions, such as by processing the style image 122 using an SRGAN implementation of the resolution neural network 206 to generate the upscaled style image 302.

Step 506 generates a style image feature map that includes style features from the second set of style attributes, and a transferred image feature map that includes image features from an upscaled version of the transferred image. The feature extractor module 306, for instance, populates the style image features 308 to the style image feature map 310. In an implementation where style features are extracted via patch sampling from the upscaled style image 302, this includes populating the sampled patches to the style image feature map 310.

Further, the upscaled transferred image 304, for instance, is processed by the feature extractor module 306 to extract the transferred image features 312 which are used to generate the transferred image feature map 314. As described above, this can be performed by sampling patches from upscaled transferred image 304, such as by randomly sampling patches of a discrete size from the upscaled transferred image 304 and populating the patches to the transferred image feature map 314.

Step 508 generates a swapped feature map by matching style features from the style image feature map with image features from the transferred image feature map. For instance, the style swap module 316 leverages the resolution neural network 206 with the style image feature map 310 and the transferred image feature map 314 as inputs to generate the swapped feature map 210. Generally, the style swap process identifies, for each image feature of the transferred image feature map 314, a style feature from the style image feature map 310 that most closely matches the image feature. In an implementation where the style image feature map 310 and the transferred image feature map 314 are generated via patch sampling, the style swap process can include patch matching between the respective feature maps.

Step 510 generates a resolved image that includes higher resolution style attributes than the transferred image based on the swapped feature map. The resolution module 120, for instance, under operation of the style resolution system 116, leverages the resolution neural network 206 to generate the resolved image 126. In an implementation, this involves using the upscaled transferred image 304 and the swapped feature map 210 as training inputs to the resolution neural network 206 to generate the resolved image 126, such as detailed above.

For example, the resolution neural network 206 applies high resolution style features from the swapped feature map 210 to the upscaled transferred image 304 to generate the resolved image 126. The resolution neural network 206, for instance, performs feature matching by matching features from the swapped feature map 210 to corresponding features from the upscaled transferred image 304. Each feature from the swapped feature map 210 is then used to replace a respective matching feature from the upscaled transferred image 304 to generate the resolved image 126, which will have higher resolution style features than the upscaled transferred image 304.

In an implementation, the procedure 500 can be performed iteratively to enable successively higher resolution style details to be applied to the resolved image 126. For instance, the resolved image 126 can be used as a version of the transferred image 124 that is input into the process along with a higher resolution version of the upscaled style image 302. Thus, the process can proceed as described herein to obtain higher resolution style details and apply the higher resolution style details to the resolved image 126 to generate a further resolved image 126 that has higher resolution style details than the original resolved image 126.

Figure 6:
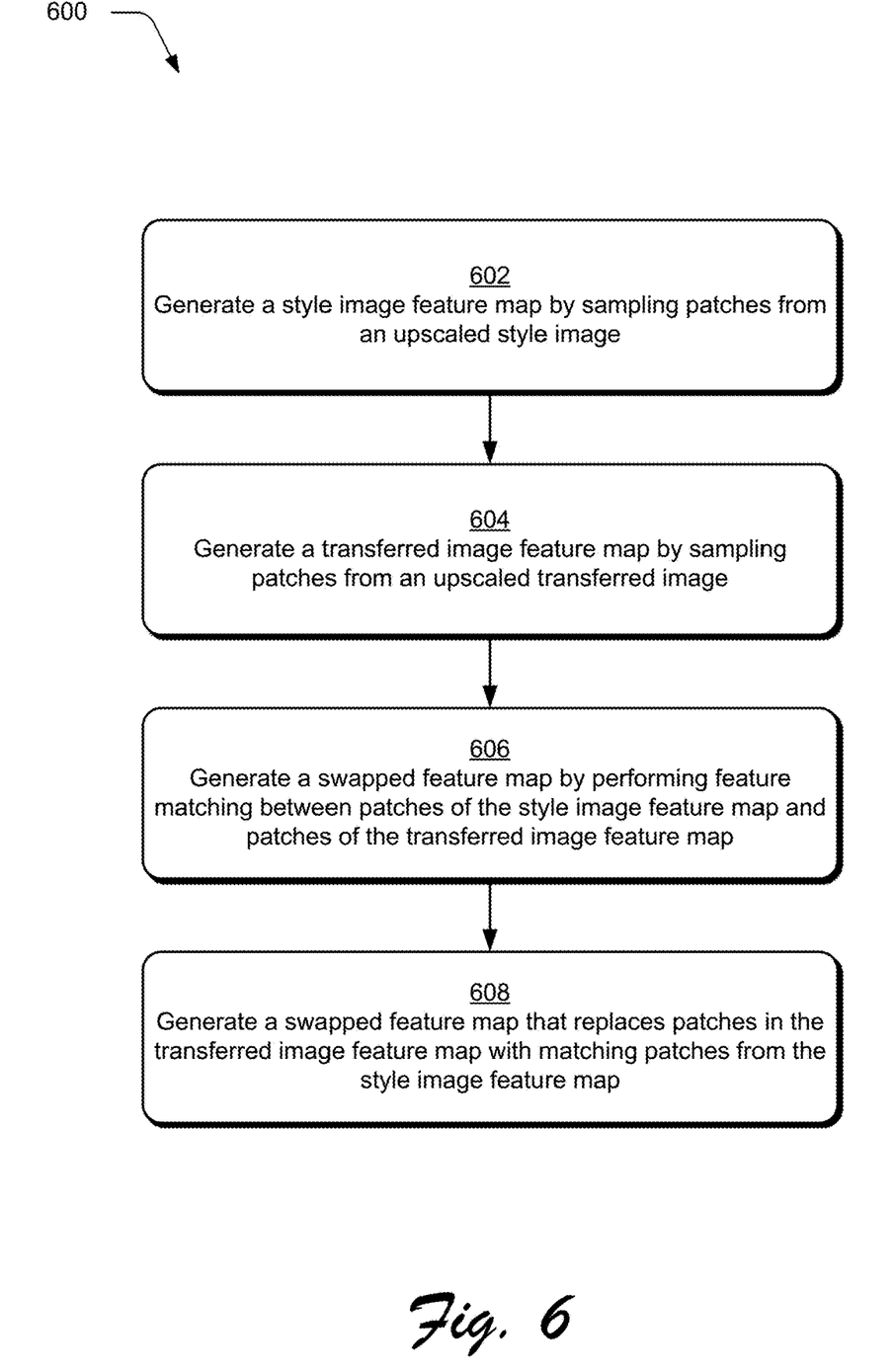
FIG. 6 depicts a procedure in an example implementation for performing a style feature swap process using a style resolution system.

FIG. 6 depicts a procedure 600 in an example implementation for performing a style feature swap process, such as using the style resolution system 116 as described above. Step 602 generates a style image feature map by sampling patches from an upscaled style image. The feature extractor module 306, for instance, under operation of the style resolution system 116 leverages the resolution neural network 206 to randomly samples patches from the upscaled style image 302 to generate the style image feature map 310. In an implementation, the patches are sampled based on a discrete patch size, such as 320 pixel×320 pixel patches.

Step 604 generates a transferred image feature map by sampling patches from an upscaled transferred image. For example, the feature extractor module 306, under operation of the style resolution system 116, leverages the resolution neural network 206 to randomly samples patches from the upscaled transferred image 304 to generate the transferred image feature map 314. The patches can be sampled in various sizes, and in an implementation can be sampled according to a discrete patch size, such as 320 pixel×320 pixel patches. Patches used to generate the style image feature map 310 and the transferred image feature map 314, for example, can be of the same size to facilitate easier feature swapping between the two maps.

Step 606 generates a swapped feature map by performing feature matching between patches of the style image feature map and patches of the transferred image feature map. The style swap module 316, for instance, under operation of the style resolution system 116 leverages the resolution neural network 206 to match features (e.g., shape-related features such as edges, corners, ridges, and other regions and/or points of interest) from individual patches of the style image feature map 310 to corresponding features in individual patches of the transferred image feature map 314.

As described above, feature matching can be implemented for each patch of the style image feature map 310 by calculating an inner product between the patch and each patch of the transferred image feature map 314. Two patches from the respective feature maps with a highest inner product can be tagged as a match. This process can be performed iteratively until patch matches from the transferred image feature map 314 for most or all of the patches of the style image feature map 310 are identified.

Step 608 generates a swapped feature map that replaces patches in the transferred image feature map with matching patches from the style image feature map. For example, the style swap module 316, under operation of the style resolution system 116, replaces individual patches from the transferred image feature map 314 with matching patches identified from the style image feature map 310 to generate the swapped feature map 210. As described above, the swapped feature map 210 can then be leveraged to create the resolved image 126 with higher resolution style features than those originally present in the transferred image 124.

Accordingly, techniques for high resolution style transfer enable high resolution style features to be extracted from a style image and applied to a input image, which is not possible using convention techniques.

Example System and Device

Figure 7:
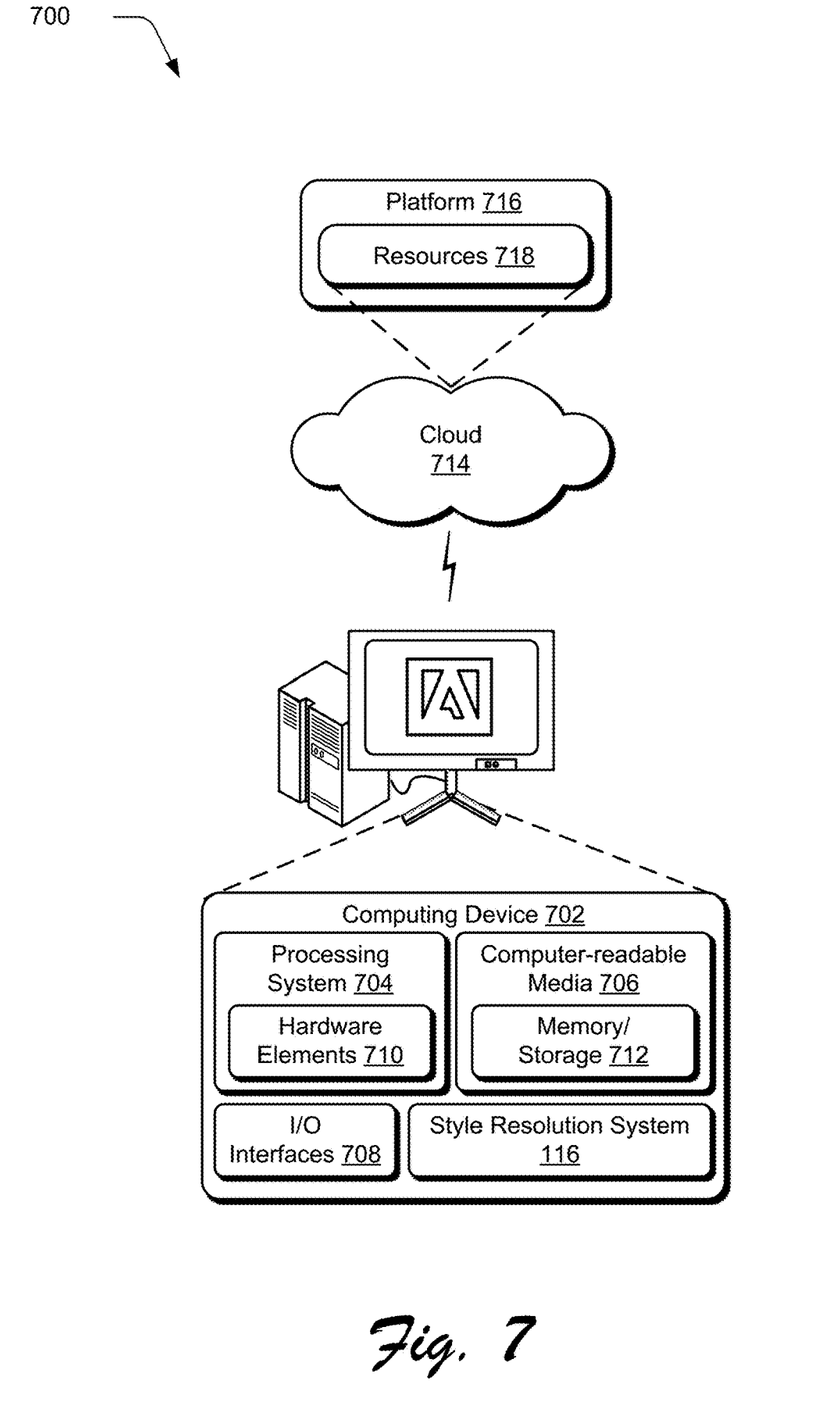
FIG. 7 illustrates an example system including various components of an example device that can be implemented as any type of computing device as described and/or utilized with reference to FIGS. 1-6 to perform implementations of techniques described herein.

FIG. 7 illustrates an example system generally at 700 that includes an example computing device 702 that is representative of one or more computing systems and/or devices that may implement the various techniques described herein. This is illustrated through inclusion of the style resolution system 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium high resolution style transfer environment, a method implemented by at least one computing device, the method comprising:
   generating, by the at least one computing device, a transferred image that includes content from an input image transformed by applying a first set of style attributes from a style image to the input image;
   extracting, by the at least one computing device, a second set of style attributes from an upscaled version of the style image, the second set of style attributes being of higher visual resolution than the first set of style attributes;
   generating, by the at least one computing device, a style image feature map that includes style features from the second set of style attributes, and a transferred image feature map that includes image features from an upscaled version of the transferred image;
   generating, by the at least one computing device, a swapped feature map by matching style features from the style image feature map with image features from the transferred image feature map; and
   generating, by the at least one computing device, a resolved image that includes higher resolution style attributes than the transferred image based on the swapped feature map.

2. The method as described in claim 1, wherein said generating the transferred image comprises one or more of applying a color attribute from the style image to the input image, or applying a texture attribute from the style image to the input image, to generate the transferred image.

3. The method as described in claim 1, wherein the upscaled version of the style image comprises a higher resolution version of the style image than the original style image.

4. The method as described in claim 1, wherein said extracting the second set of style attributes comprises randomly sampling patches from the upscaled version of the style image, and wherein said generating the style image feature map comprises populating the patches to the style image feature map.

5. The method as described in claim 1, further comprising randomly sampling patches from the upscaled version of the transferred image, and wherein said generating the transferred image feature map comprises populating the patches to the transferred image feature map.

6. The method as described in claim 1, wherein said generating the style image feature map comprises populating style image patches from the upscaled version of the style image to the style image feature map, said generating the transferred image feature map comprises populating transferred image patches from the upscaled version of the transferred image to the transferred image feature map, and wherein said generating the swapped feature map comprises comparing the style image patches to the transferred image patches to match style features from the style image feature map to image features from the transferred image feature map.

7. The method as described in claim 1, wherein said generating the style image feature map comprises populating style image patches from the upscaled version of the style image to the style image feature map, said generating the transferred image feature map comprises populating transferred image patches from the upscaled version of the transferred image to the transferred image feature map, and wherein said generating the swapped feature map comprises replacing transferred image patches with matching style image patches to generate the swapped feature map.

8. The method as described in claim 1, wherein said generating the style image feature map comprises populating style image patches from the upscaled version of the style image to the style image feature map, said generating the transferred image feature map comprises populating transferred image patches from the upscaled version of the transferred image to the transferred image feature map, and wherein said generating the swapped feature map comprises calculating an inner product between each of the style image patches and the transferred image patches, respectively, wherein a highest inner product indicates a match between a style image patch and a transferred image patch.

9. The method as described in claim 1, wherein said generating the resolved image comprises replacing features from the upscaled version of the transferred image with features from the swapped feature map to generate the resolved image.

10. The method as described in claim 1, wherein said generating the resolved image comprises using the upscaled version of the transferred image and the swapped feature map to train a resolution neural network to output the resolved image.

11. In a digital medium high resolution style transfer environment, a system comprising:
a processing system; and
one or more computer-readable storage media storing instructions that are executable by the processing system to implement:
a transfer module to generate a transferred image by applying a first set of style attributes from a style image to an input image to generate the transferred image to include content from the input image transformed using the first set of style attributes;
a feature extractor module to extract a second set of style attributes from an upscaled version of the style image and generate a style image feature map that includes style features from the second set of style attributes, and to generate a transferred image feature map that includes image features from an upscaled version of the transferred image;
a style swap module to generate a swapped feature map by matching style features from the style image feature map to image features from the transferred image feature map to generate the swapped feature map to include the matched style features; and
a style resolution system to implement a resolution neural network to generate a resolved image that includes higher resolution style attributes than the transferred image and based on the swapped feature map.

12. The system as described in claim 11, wherein the feature extractor module is configured to extract the second set of style attributes from the upscaled version of the style image by randomly sampling patches from the upscaled version of the style image to generate the style image feature map.

13. The system as described in claim 11, wherein the feature extractor module is configured to generate the transferred image feature map by randomly sampling patches from the upscaled version of the transferred image and populating the patches to the transferred image feature map.

14. The system as described in claim 11, wherein:
the feature extractor module is configured to generate the style image feature map by populating style image patches from the upscaled version of the style image to the style image feature map, and generate the transferred image feature map by populating transferred image patches from the upscaled version of the transferred image to the transferred image feature map; and
the style swap module is configured to generate the swapped feature map by comparing the style image patches to the transferred image patches to match style features from the style image feature map to image features from the transferred image feature map.

15. The system as described in claim 11, wherein:
the feature extractor module is configured to generate the style image feature map by populating style image patches from the upscaled version of the style image to the style image feature map, and generate the transferred image feature map by populating transferred image patches from the upscaled version of the transferred image to the transferred image feature map; and
the style swap module is configured to generate the swapped feature map by calculating an inner product between each of the style image patches and the transferred image patches, respectively, wherein a highest inner product indicates a match between a style image patch and a transferred image patch.

16. The system as described in claim 11, wherein the style resolution system is configured to train the resolution neural network to output the resolved image using the upscaled version of the transferred image and the swapped feature map.

17. In a digital medium high resolution style transfer environment, a system comprising:
one or more processors; and
one or more computer-readable storage media storing instructions that are executable by the one or more processing to perform operations including:
generating, by the at least one computing device, a transferred image that includes content from an input image transformed by applying a first set of style attributes from a style image to the input image;
extracting, by the at least one computing device, a second set of style attributes from an upscaled version of the style image, the second set of style attributes being of higher visual resolution than the first set of style attributes;
generating, by the at least one computing device, a style image feature map that includes style features from the second set of style attributes, and a transferred image feature map that includes image features from an upscaled version of the transferred image;
generating, by the at least one computing device, a swapped feature map by matching style features from the style image feature map with image features from the transferred image feature map; and
generating, by the at least one computing device, a resolved image that includes higher resolution style attributes than the transferred image based on the swapped feature map.

18. The system as described in claim 17, wherein said generating the style image feature map comprises populating style image patches from the upscaled version of the style image to the style image feature map, said generating the transferred image feature map comprises populating transferred image patches from the upscaled version of the transferred image to the transferred image feature map, and wherein said generating the swapped feature map comprises replacing transferred image patches with matching style image patches to generate the swapped feature map.

19. The system as described in claim 17, wherein said generating the resolved image comprises processing the upscaled version of the transferred image using the swapped feature map by replacing features from the upscaled version of the transferred image with features from the swapped feature map to generate the resolved image.

20. The system as described in claim 17, wherein said generating the resolved image comprises using the upscaled version of the transferred image and the swapped feature map to train a resolution neural network to output the resolved image.

* * * * *